C. W. FINLEY.
ELECTRICAL CONDUIT BUSHING.
APPLICATION FILED MAR. 6, 1916.

1,240,188. Patented Sept. 18, 1917.

WITNESSES.
L. R. Greusel.
Rupert L. Grunman.

INVENTOR
Charles W. Finley
By Victor E. Randall
Atty.

UNITED STATES PATENT OFFICE.

CHARLES W. FINLEY, OF BATTLE CREEK, MICHIGAN.

ELECTRICAL-CONDUIT BUSHING.

1,240,188.   Specification of Letters Patent.   Patented Sept. 18, 1917.

Application filed March 6, 1916. Serial No. 82,307.

*To all whom it may concern:*

Be it known that I, CHARLES W. FINLEY, a citizen of the United States, residing at Battle Creek, in the county of Calhoun and State of Michigan, have invented certain new and useful Improvements in Electrical-Conduit Bushings, of which the following is a specification.

This invention particularly relates to an improved means for closing the conduit with a removable cap.

Ordinarily, conduits of this nature are closed with wooden plugs for the purpose of preventing foreign substances, such as plaster, fragments of brick, tile, etc., from clogging the tubing employed, but owing to carelessness in fitting plugs of the nature specified oftentimes said plugs fall within the conduit, because of looseness in fitting or from shrinkage, and cause an obstruction which they were designed to prevent.

My improvements in the main have for their object to provide a very simple, economical and efficient device for the purpose, which can be easily placed or removed as expedient.

For the purpose of explaining my electrical conduit bushing as set forth, the accompanying drawing illustrates an improved embodiment thereof.

In the drawings, Figure 1 is a broken perspective view of a junction box and conduits with my improved bushing and closure.

In the drawings, like marks of reference refer to corresponding parts in the views, in which A, is the junction box; b, the conduits; and C, the bushing.

For the purpose of illustration I have shown an ordinary metallic round open-ended type of junction box having apertures for the reception of the two conduits, B—B. The conduits where they enter the box A are exteriorly threaded and project sufficiently within the box to permit the interiorly-threaded ring bushings C to be screwed thereon, the conduits being held from end thrust with respect to said box by means of jam nuts 1 screw-threaded on to the respective conduits and against said box from the exterior, in the customary manner.

Figure 1:
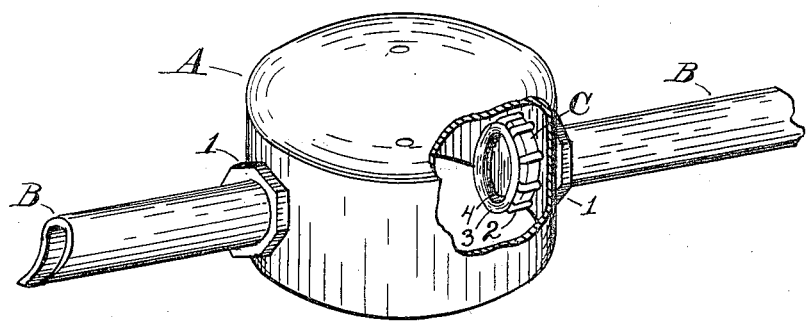
Figure 2:
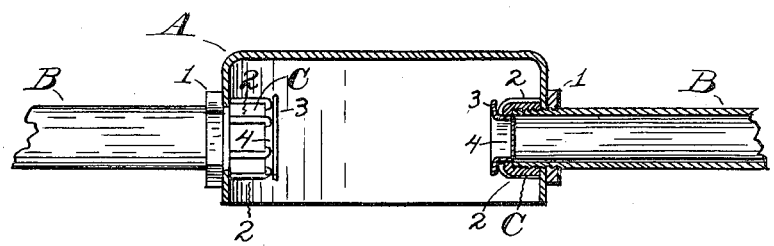
Fig. 2 is a sectional side elevation.
Figure 4:
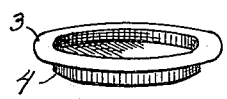
Fig. 4 is a perspective view of a closure.
Figure 3:
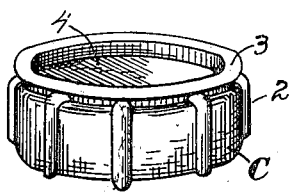
Fig. 3 is a perspective view of a bushing and its closure intact.

The bushing C in Figs. 1, 2 and 3 have exterior longitudinal ribs 2, the upper ends of which trend radially inward and may terminate flush with or outside of the indrawn bushing top opening, the vertical ribbed parts affording proper means for a wrench grip to place or remove the bushing with respect to its conduit, the indrawn upper terminal thereof forming spacing rests upon which the rims 3 of the dished centered closures 4 rest when the conduits are closed.

The closures 4 preferably are formed from sheet iron of a thin and inexpensive nature and may be tinned, galvanized or otherwise treated as expedient.

In fitting a closure within a bushing the dished center-part is formed sufficiently large and deep that when introduced within the opening at the indrawn top of the bushing the side of the cupped part of said bushing will rest wholly within the bushing to form a closure therefor and snugly impinge the throat thereof to prevent its accidental dislodgment, the rim 4 of the closure resting upon the indrawn upper ends of the ribs 2, whereby a space will be formed between the brushing and the closure to introduce a screw driver, knife blade, nail, coin or any other device by which said closure may be readily and easily removed.

From the foregoing description taken in connection with the drawing, a more extended explanation of the workings and advantages of my improved conduit bushing is believed will not be necessary.

Having, therefore, set forth the objects and advantages of my invention, what I claim as new and desire to secure by Letters Patent, is:

1. The combination with a junction box, a conduit having a threaded end extending through the side wall thereof and a jam nut screw-threaded on said conduit against the outer wall of said box, of a ring bushing having longitudinal exterior ribs extending above said bushing screw-threaded upon said conduit within said box, and a dished closure having an outwardly flaring rim fitted within said bushing, the rim of said closure resting on the extending portions of said longitudinal exterior ribs, for the purpose set forth.

2. The combination with a junction box, a conduit having a threaded end extending through the side wall thereof and a jam nut screw-threaded on said conduit against the outer wall of said box, of a ring bushing having longitudinally-extending exterior ribs with radially indrawn top terminals screw threaded on said conduit within said box, and a dished closure having an outwardly-flaring rim fitted within said bushing, the rim of said bushing resting upon the radial terminals of said ribs, substantially as set forth and for the purpose described.

3. The combination with a junction box, a conduit having a threaded end extending through the side wall thereof and a jam nut screw threaded on said conduit against the outer wall of said box, of a ring bushing screw-threaded upon said conduit within said box, said bushing having raised portions extending longitudinally therewith from the outer open end of said bushing and a dished closure fitted within said bushing, said closure having an outwardly flaring marginal rim seated upon the raised portions of the outer end of said bushing, for the purpose set forth and described.

Signed at Battle Creek, in the county of Calhoun and State of Michigan, this 2d day of March, A. D. 1916.

CHARLES W. FINLEY.

Witnesses:
N. F. WINGATE,
F. H. WINGATE.